Dec. 28, 1926.
W. C. HEDGCOCK
1,612,189
BRAKE ARRANGEMENT
Filed August 15, 1924 2 Sheets-Sheet 1
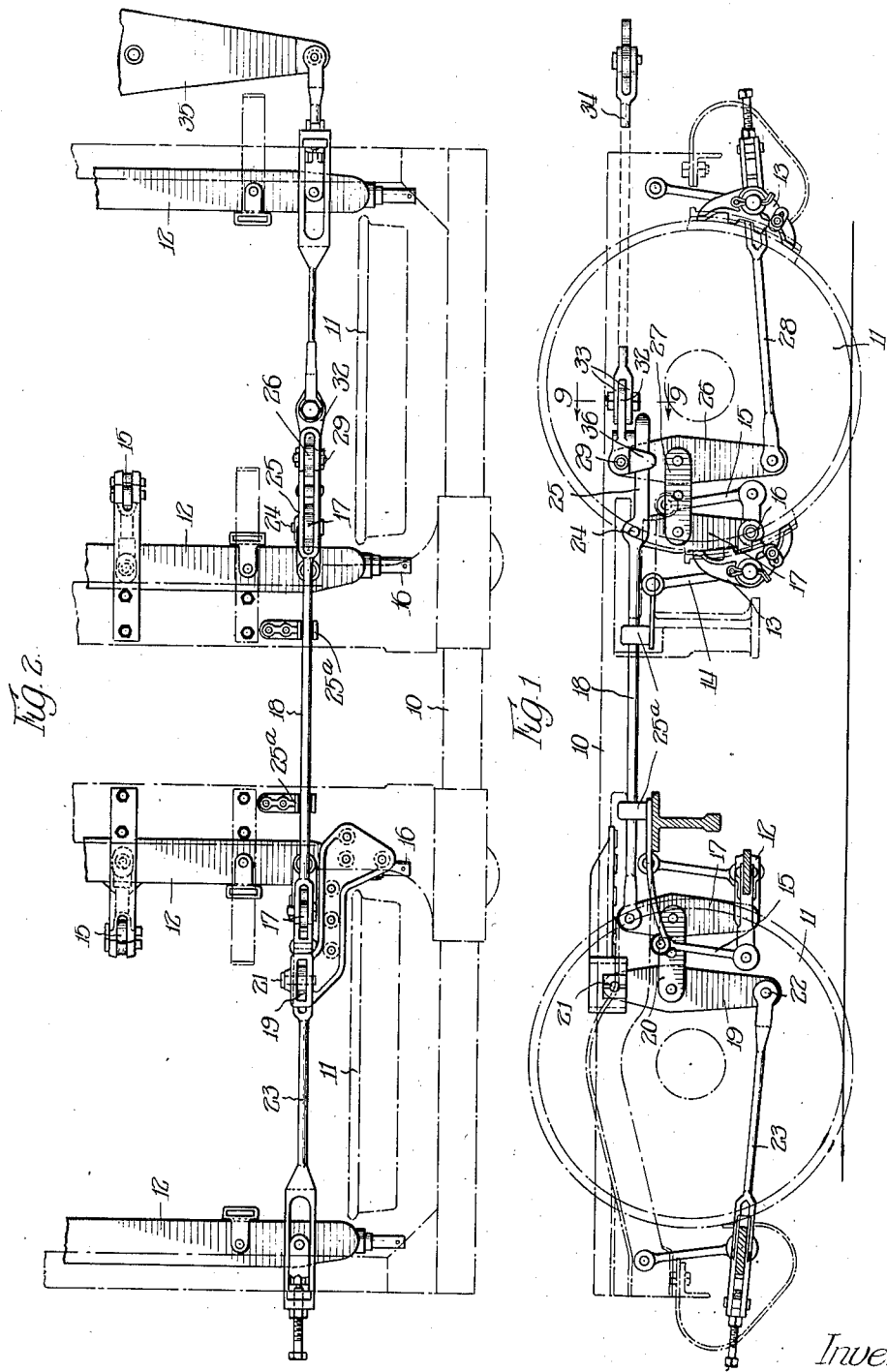
Witness:
R. Burkhardt
Inventor:
William C. Hedgcock,
By Wilkinson, Huxley, Byron & Knight
Attys Dec. 28, 1926.
W. C. HEDGCOCK
BRAKE ARRANGEMENT
Filed August 15, 1924
1,612,189
2 Sheets-Sheet 2
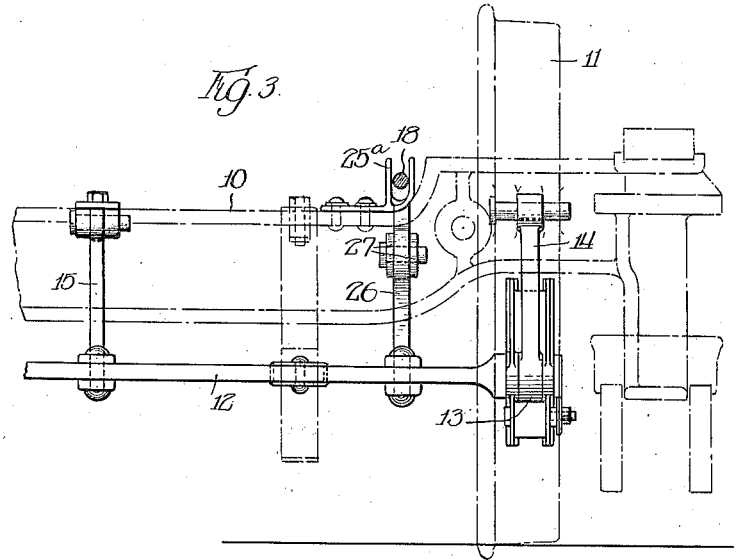
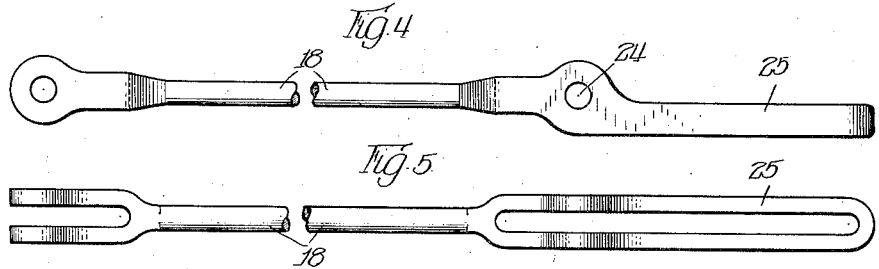
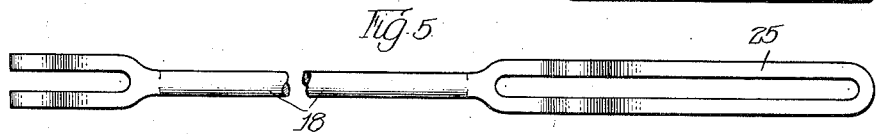
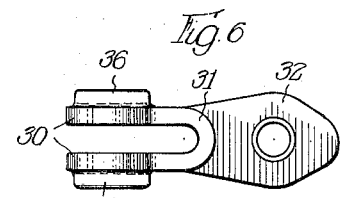
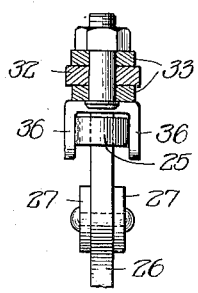
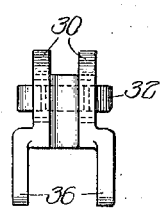
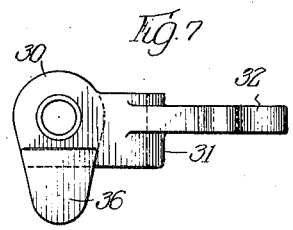
Witness:
J. Burkhardt.
Inventor:
William C. Hedgcock,
By Wilkinson, Huxley, Byron & Knight
Attys.

Patented Dec. 28, 1926.

1,612,189

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE ARRANGEMENT.

Application filed August 15, 1924. Serial No. 732,151.

This invention relates to brake mechanism.

In railway car trucks there is a relatively small amount of space for parts of brake rigging and in some instances the clearance for the operating parts is not only extremely limited, but inadequate.

Accordingly, one object of the present invention is to provide a simple, durable and efficient brake rigging supporting and guiding arrangement to meet clearance conditions that will not permit of the utilization of the usual methods of support and guidance.

Another object of the invention is to provide a simple brake rigging arrangement which is adapted to meet the various requirements under service conditions.

These and other objects are accomplished by means of the arrangement disclosed on the accompanying sheets of drawings, in which—

Figure 1 is a fragmentary side elevation of a railway car truck embodying brake rigging in accordance with my invention.

Figure 2 is a fragmentary top plan view of the same arrangement.

Figure 3 is a fragmentary end view of the arrangement shown in Figure 1.

Figure 4 is a fragmentary side elevation of a brake operating rod having an extension jaw thereon for slidably and guidably supporting a brake lever in accordance with my invention.

Figure 5 is a top plan view of the brake rod shown in Figure 4.

Figures 6, 7 and 8 are top plan side elevational, and end views respectively of a swivel jaw which cooperates with the brake operating rod shown in Figure 5 for slidably guiding and supporting the brake lever.

Figure 9 is a sectional view taken in the plane of line 9—9 of Figure 1.

The various novel features of the invention will be apparent from the following description and drawings and will be particularly pointed out in the appended claims.

Referring to the figures of the drawings, it will be noted that the invention is illustrated in connection with a railway car truck including a frame 10 supported upon the truck wheels 11, there being brake beams 12 on opposite sides of each pair of wheels. Brake heads 13 having brake shoes are secured to the opposite ends of the brake beams for engagement with the associated truck wheels 11. The brake beams are supported by the usual end hangers 14 and a centrally arranged balanced hanger 15, which hangers may be connected to the truck frame in any suitable manner.

In this particular instance my invention is illustrated in connection with a clasp type of brake rigging in which there is a system of rods and levers at each side of the truck just inside of the wheels, but it will be understood that the invention is broadly applicable to brake riggings other than the clasp type.

In this instance, with the particular type of brake rigging shown, near each end of the brake beams 12 is a fulcrum 16 to which the lower end of an associated brake lever 17 is connected. The upper ends of said brake levers are operatively connected by a brake operating rod 18. A second truck lever 19, shown at the left-hand side of Figure 1, is connected to the lever 17 by links 20, the upper end of the lever 19 being anchored as at 21 and the lower end being connected at 22 to a slack adjuster rod 23, in turn connected to the outer brake beam 12.

Referring more particularly to the brake arrangement at the right-hand end of Figure 1, it will be noted that the upper end of the brake lever 17 is pivotally connected at 24 between jaws of a jaw extending portion 25 of the brake operating tension rod 18. the latter of which is guidedly supported in bearings 25$^a$ mounted on the car truck. Thus it is seen that the right-hand truck lever 17 is supported at its bottom end by the brake beam jaw 16 and at the upper end by the pull rod 18, which is guidedly supported in the bearing members 25$^a$. The right-hand brake lever 17 is connected to another brake lever 26 at intermediate points of the levers 17 and 26 by links 27 arranged on both sides of said levers. The lower end of lever 26 is connected through a slack adjuster rod 28 to the right-hand outside brake beam 12.

In the arrangement here shown the truck lever 26, which is not supported by any of the usual methods, is guidedly supported in a manner to make possible operation with the necessary freedom and clearance in a new brake rigging combination. The upper end of the brake lever 26 is pivotally connected by a pin 29 between the jaws 30 of a swivel 31 having a tongue 32 in turn pivotally connected between the jaws 33 of a pull rod 34 connected to one end of a radius bar 35. To guidedly support the brake lever 26, it passes upwardly between the jaws of the jaw member 25 so that downwardly extending ears 36 formed on the swivel jaws 30 may embrace the jaw member 25 and rest upon the latter, whereby said swivel member 31, with the lever 26 may slide on the jaw member 25 which forms an extension of the brake operating tension rod 18. It is seen, therefore, that not only is the upper end of one brake lever 17 supported by the brake operating rod 18, but an adjacent brake lever 26 is guidedly supported by an extension of said brake operating rod in a manner not only to meet conditions in this particular brake equipment, but also in a manner to meet all of the requirements under general service conditions.

I claim:

1. In brake mechanism, the combination of a brake lever, an operating rod therefor, and another brake lever slidably supported on said rod.

2. In brake mechanism, the combination of a brake lever, an operating rod connected thereto, and another brake lever bodily movably supported on said rod.

3. In brake mechanism, the combination of a brake lever, an operating rod therefor, and another brake lever bodily movably supported by said rod.

4. In brake mechanism, the combination of a brake lever, an operating rod connected thereto, and another brake lever slidably supported by said rod.

5. In brake mechanism, the combination of a brake lever, an operating rod connected thereto, and another brake lever suspended from said rod and bodily movable thereon.

6. In brake mechanism, the combination of a brake lever, an operating rod connected thereto and having an extension, and another brake lever guidedly supported upon said extension.

7. In brake mechanism, the combination of a brake operating rod having a jaw portion, a brake lever pivotally connected to said jaw portion, and another brake lever slidably mounted on said jaw portion.

8. In brake mechanism, the combination of a brake operating rod, and a brake lever normally movable along said rod during a braking operation.

9. In brake mechanism, the combination of a brake operating rod, a brake lever pivotally connected thereto, and another brake lever normally bodily movable thereon during a braking operation.

10. In brake mechanism, the combination of a brake lever, an operating rod to which said lever is pivotally connected and having an extension, a second brake lever, a swivel connected to said second brake lever and having a portion cooperating with said extension for guidedly supporting said second brake lever.

11. In brake mechanism, the combination of a brake lever, a tension rod to which said brake lever is connected and having an extension, a second brake lever connected to the first, and a member connected to said second brake lever and having a portion cooperating with said extension for guidedly supporting said second brake lever.

12. In brake mechanism, the combination of brake heads mounted on opposite sides of a wheel, a brake lever operatively connected to each head, a member connecting said levers, and an operating rod connected to one of said levers and slidably supporting the other of said levers.

13. In brake mechanism, the combination of brake heads mounted on opposite sides of a wheel, a brake lever operatively connected to each head, and an operating rod connected to one of said levers and having a portion for guidedly supporting said other lever.

Signed at Chicago, Illinois, this 11th day of August, 1924.

WILLIAM C. HEDGCOCK.